May 31, 1927. 1,630,540
T. F. RAINSFORD
DERRICK ATTACHMENT FOR TRACTORS
Filed Aug. 26, 1925 4 Sheets-Sheet 1
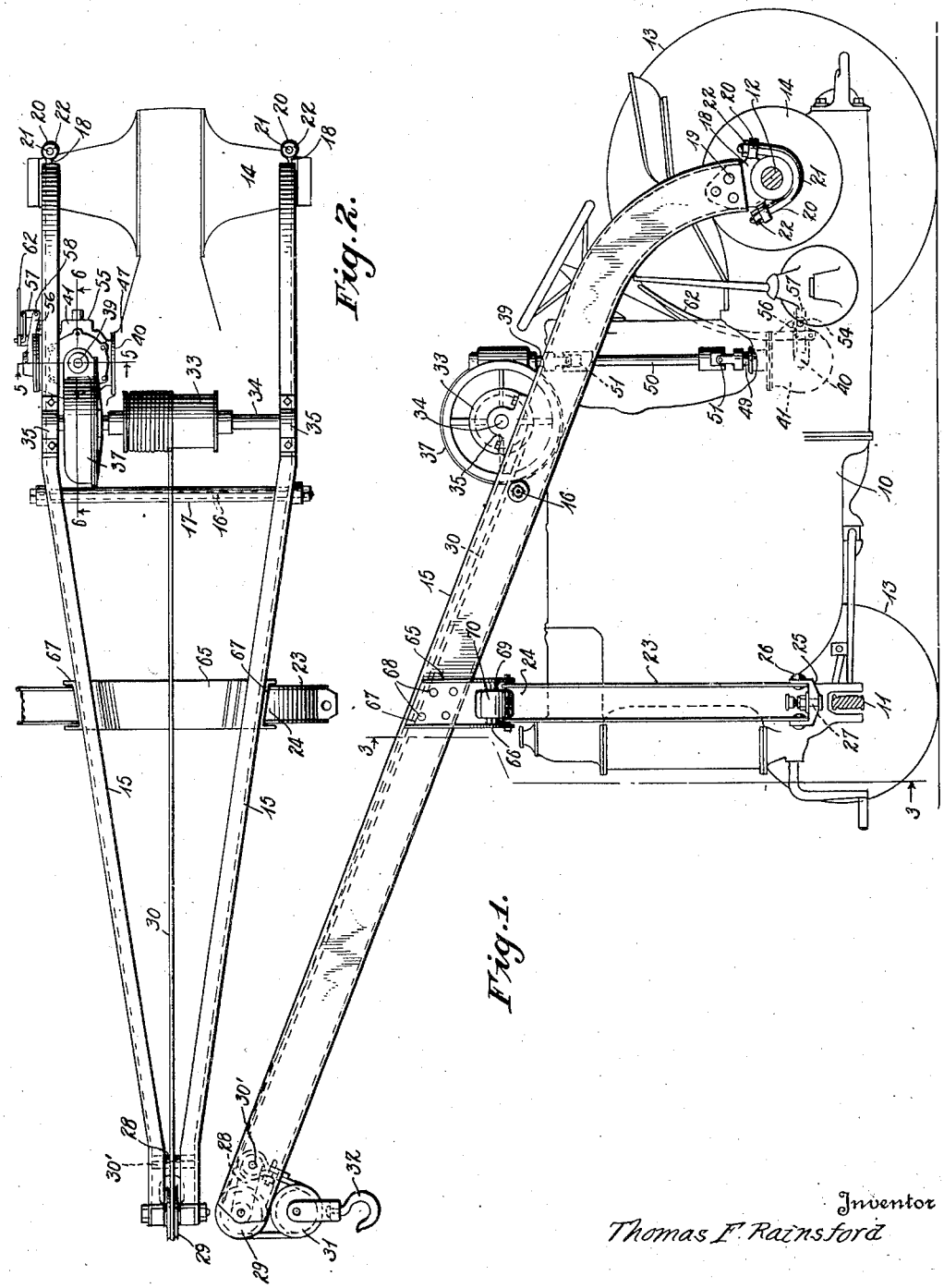
Inventor
Thomas F. Rainsford
By Whittemore Hulbert Whittemore
+Belknap Attorneys

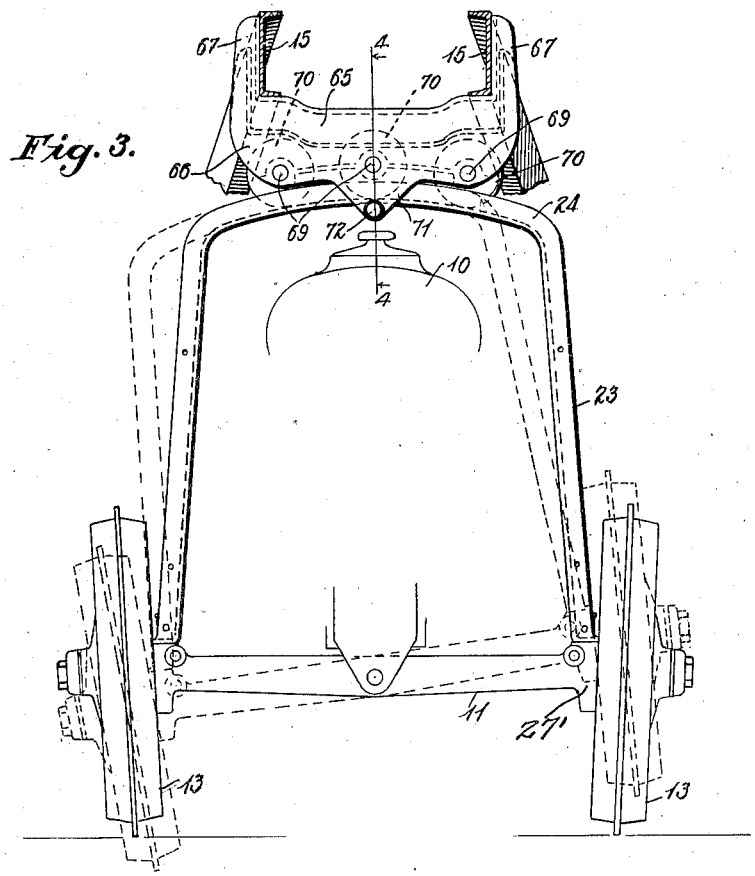
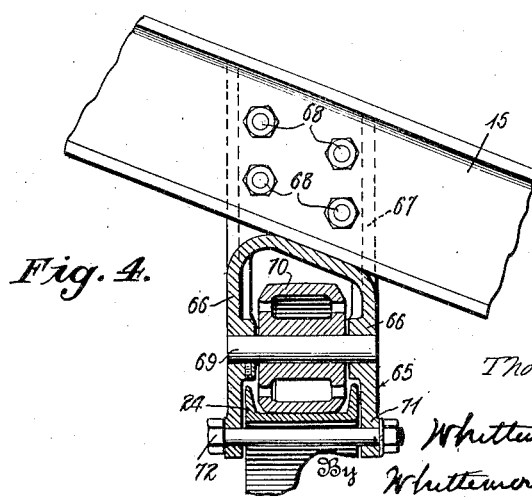

May 31, 1927.

T. F. RAINSFORD 1,630,540

DERRICK ATTACHMENT FOR TRACTORS

Filed Aug. 26, 1925     4 Sheets-Sheet 3

Inventor
Thomas F. Rainsford

By Whittemore Hulbert Whittemore
& Belknap    Attorneys

May 31, 1927.　　　　　　　　　　　　　　　　　1,630,540
T. F. RAINSFORD
DERRICK ATTACHMENT FOR TRACTORS
Filed Aug. 26, 1925　　　　　4 Sheets-Sheet 4

Inventor
Thomas F. Rainsford
By Whittemore Hulbert Whittemore
& Belknap
Attorneys Patented May 31, 1927.

1,630,540

UNITED STATES PATENT OFFICE.

THOMAS F. RAINSFORD, OF DETROIT, MICHIGAN, ASSIGNOR TO WHITEHEAD AND KALES, INC., OF RIVER ROUGE, MICHIGAN, A CORPORATION OF MICHIGAN.

DERRICK ATTACHMENT FOR TRACTORS.

Application filed August 26, 1925. Serial No. 52,655.

The invention relates to a derrick attachment for tractors and the like and more particularly to a simple, sturdy and durable hoisting apparatus particularly adapted for association with Fordson tractors.

Figure 5:
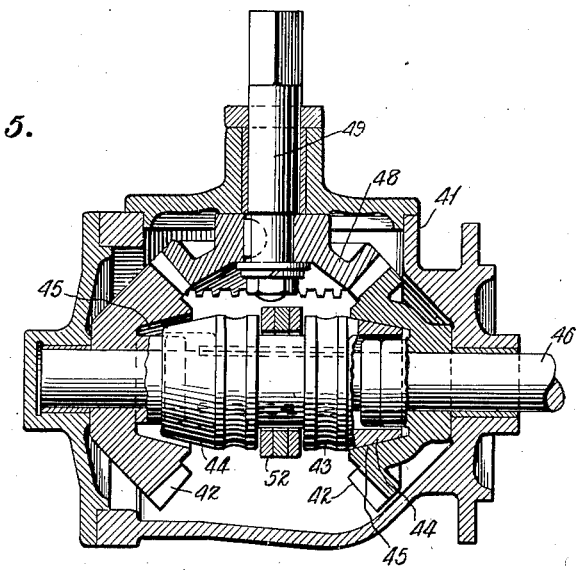
Figure 6:
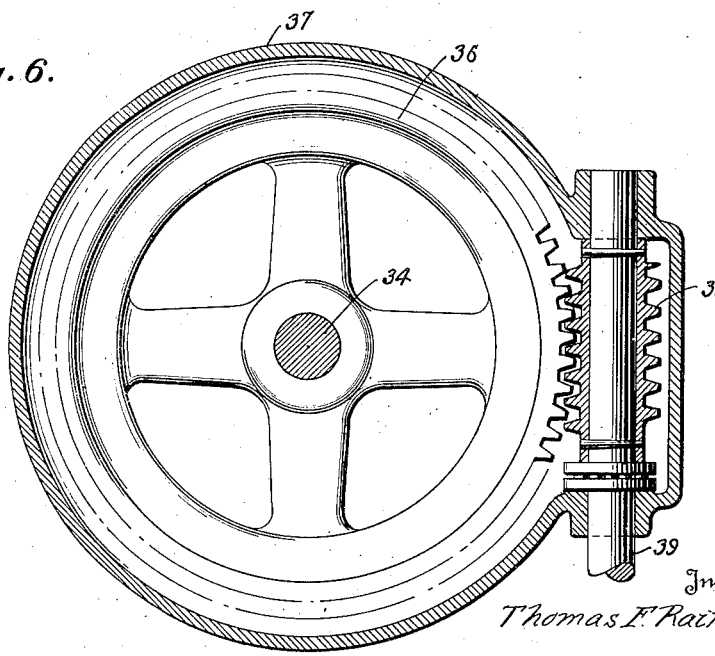
Figure 7:
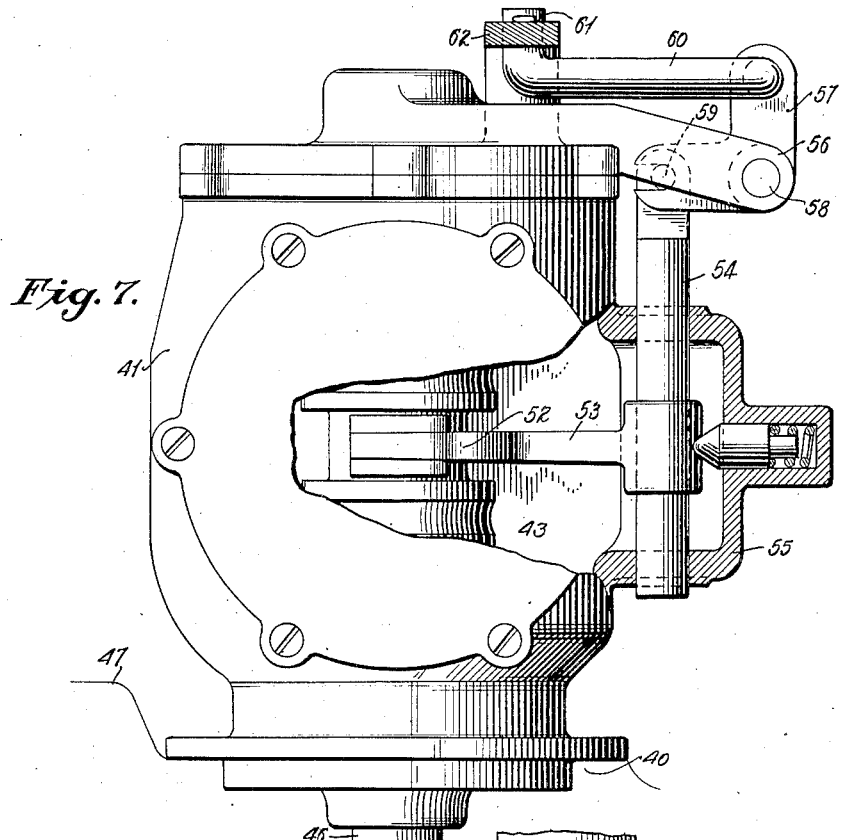
Figure 8:
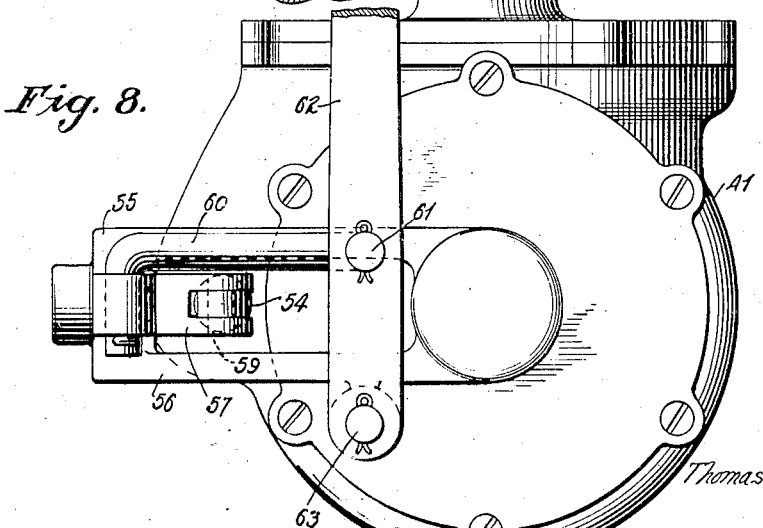

The invention has among its objects to simplify, render more efficient, and improve generally devices of this general character, and these as well as other objects, advantages and novel details of construction will be made more apparent as this description proceeds, especially when considered in connection with the accompanying drawings wherein Figure 1 is a fragmentary side elevation of a tractor with my invention attached thereto, Figure 2 is a top plan view of the structure illustrated in Figure 1, certain parts of the tractor being omitted and certain parts broken away for the sake of clearness, Figure 3 is a sectional view taken substantially on the plane indicated by line 3—3 in Figure 1, Figure 4 is a detailed sectional view taken substantially on the plane indicated by line 4—4 in Figure 3, Figure 5 is a fragmentary vertical sectional view taken substantially on the plane indicated by the line 5—5 in Figure 2, Figure 6 is a fragmentary vertical sectional view taken substantially on the plane indicated by the line 6—6 in Figure 2, Figure 7 is a top plan view partly in section showing the clutch shifting mechanism, and Figure 8 is an end elevation of the structure shown in Figure 7.

Referring now particularly to the drawings wherein like reference characters indicate like parts, it will be noted that there is illustrated a tractor 10 having front and rear axles 11 and 12 upon which wheels 13, herein conventionally shown, are mounted, while surrounding the rear axle is the customary housing 14.

My invention includes a frame comprising a pair of frame members 15 formed preferably, although not necessarily, of channel bars. These frame members 15 extend longitudinally of the tractor and are inclined upwardly in a forward direction, at the same time being inclined or arranged in converging relation whereby the forward ends thereof are arranged adjacent one another and are positioned above and forward of the front of the tractor. The frame members 15 are preferably arranged with the flanges of the U-bars extending inwardly and are united in their adjacent spaced relation by means of bolts or tie rods 16 arranged at spaced intervals which pass therethrough and also through spacing sleeves 17 which bear with their ends against the inner faces of the vertical webs of the U-bar frames.

The frame at its rear end is mounted upon the rear axle or more particularly upon the rear axle housing by means of brackets 18 secured as at 19 to the ends of the frame members 15, these brackets being formed with lateral perforated studs 20 through which is passed the ends of a U-bolt 21 which straddles the axle or axle housing, is passed through the apertures in studs 20 and secured in place by nuts 22 in the manner shown.

The frame formed by the members 15 is supported at the front of the vehicle by means of a frame member 23 formed preferably of a U-bar and bent into a substantially inverted U shape with the ends thereof connected to the steering knuckles of the front axle in a manner to be immediately described. The top portion 24 of frame member 23 constitutes a trackway for a carrier carriage which forms the immediate support between the frame members 15 and 23, this frame portion 24 being preferably curved on an arc the center of which is coincident with the point of pivotal connection between the front axle and the tractor chassis.

The connection between the front axle and each end of frame member 23 is accomplished by removing the king bolt and inserting a substantially U-shaped bracket 25 to which the lower end of member 23 may be secured as at 26, the bracket 25 being apertured centrally thereof whereby upon the replacement of the king pin 27 it may be passed through the aperture in bracket 25 for securing the latter in place upon the steering knuckles 27'.

From Figures 3 and 4 it will be noted that the connection between frame members 15 and 23 consists of a bracket 65 preferably in the form of a carriage, this bracket being of a hollow cast construction and formed with spaced depending side portions 66 and upwardly extending ends 67, which latter are secured in any suitable manner, herein shown as by bolts 68 to the frame members 15. Mounted between the depending side portions 66 of the bracket or carriage 65, upon shafts 69 are rollers 70, these rollers being adapted to engage within the channel of frame member 23 and particularly the arcuate or curved portion 24 thereof, the rollers being forced to travel longitudinally of the channel and guided therein by the flanges of the frame member 23. The bracket 65 is further provided with a pair of centrally arranged downwardly extending projections 71 through which is passed a bolt or pin 72 which extends under frame member 23 and prevents a vertical displacement of bracket 65. With this construction frame member 15 is supported vertically of the front axle of the tractor but a rocking movement of the front axle such as suggested in Figure 3 is possible without imparting a weaving or distorting action to the frame member 15. Thus should the front wheels of the tractor encounter rough or uneven ground they will be permitted to rock as suggested by the dotted lines in Figure 3, while the frame member 15 will be supported in a substantially transverse horizontal position, the bracket 65 and rollers 70 remaining relatively fixed while frame member 23 rocks therebeneath.

Secured in the opposed channel portions of the forward ends of the frame members 15 is a clevis member 28 which member not only functions to unite the forward ends of frame members 15 in spaced relation but affords a bearing for pulley 29 and a point of anchorage 30' for the end of the tackle cable or rope 30. This rope is passed around block 31 upon which is secured a load-sustaining element such as a hook 32, the rope then passing around pulley 29 and rearwardly between frame members 15 where it is wound around drum 33 supported upon a shaft 34 which in turn is mounted in bearing 35 secured preferably upon the upper horizontal flanges of the frame members 15. By detachably connecting the end of cable or rope 30 at the point of anchorage 30' this cable or rope may be connected to block 31 so that a greater speed is obtainable.

Drum 33 is preferably rotated by a power means which includes a worm gear 36 contained in a housing 37, which worm gear is fixed to shaft 34 and meshes with a worm 38 carried by a shaft 39. The reference character 40 indicates the customary point of location of the power take-off forming a part of the standard equipment of tractors of this character. At this point there is secured a housing 41 containing an arrangement of gears consisting of a pair of bevelled gears 42 alternately engageable by a shiftable clutch member 43 provided with cone clutch portions 44 engageable with cooperating clutch portions 45 on gears 42.

These gears as well as the clutch member are mounted upon the shaft 46 which extends into the housing 47 of the tractor whereby conection with the power take-off of the tractor is accomplished. Gears 42 mesh with pinion 48 fixed upon the end of shaft 49. Shafts 49 and 39 are connected by shaft 50 having universal connections 51 with said shafts 49 and 39.

Clutch member 43 is engaged by fork 52 formed on the end of an arm 53 extending at right angles from a rod 54 shiftably mounted in a portion 55 of housing 41. Mounted on the end of housing 41 is a lug or extension 56 to which a bell crank lever 57 is pivoted as at 58 and one bifurcated end of which engages a pin 59 carried in the end of rod 54. Pivotally connected to the other end of bell crank lever 57 is a link 60 which is likewise pivotally connected as at 61 to a gear shifting lever 62 pivoted as at 63 to an apertured stud or projection depending from projection 56. The upper end of gear shift lever 62 is arranged adjacent the driver's seat so that clutch member 43 may be shifted to lock either of gears 42 to shaft 46 whereby drum 33 may be rotated to wind or unwind cable 30.

With an arrangement such as herein described it is apparent that a mobile derrick is provided which may be moved about as desired by suitably manipulating the tractor and under the tractor's own power. Furthermore the hoisting tackle of the derrick is operable by power means obtained from the tractor whereby the device may be used either to lift or to lift and carry objects as desired.

The construction of the derrick is such that it may be quickly and easily attached to the tractor without material alteration of the tractor construction, and without weakening or in any wise interfering with the normal operation of the tractor. The construction, arrangement and the manner of supporting the frame members of the derrick upon the tractor not only provides a sturdy and durable construction but obtains a maximum capacity for the derrick with a given weight for the tractor.

While one specific embodiment of the invention has been illustrated and described herein in some detail it will be readily apparent that various modifications may be resorted to without departing from the spirit and scope of this invention and to this end reservation is made to make such changes as may come within the purview of the accompanying claims.

What I claim as my invention is:

1. The combination with a tractor having front and rear axles, of a derrick comprising, a frame formed of a pair of U-shaped bars secured together in forwardly converging relation, brackets formed with apertured lugs secured to the rear end of each of said frame members, U-bolts engaging said rear axle and passing through said apertured lugs for securing said frame members to said rear axle, means secured to the front axle for supporting said frame in an upwardly inclined position, a hoisting tackle mounted on said frame with the block thereof at the front end of said frame, and means for operating said hoisting tackle.

2. The combination with a tractor having front and rear axles, of a derrick comprising a frame formed of a pair of U-shaped bars secured together in forwardly converging relation, means for securing the rear ends of each of said bars to said rear axle, vertical frame members secured at the lower end thereof to the steering knuckles of the front axles and to said main frame members for securing said frame in an upwardly inclined position, a hoisting tackle mounted on said frame with the block thereof at the front end of said frame, and means for operating said hoisting tackle.

3. The combination with a tractor having front and rear axles, of a derrick comprising, a frame formed of a pair of U-shaped bars secured together in forwardly converging relation, brackets formed with apertured lugs secured to the rear end of each of said frame members, U-bolts engaging said rear axle and passing through said apertured lugs for securing said frame members to said rear axle, frame members secured at the lower ends thereof to the steering knuckles of the front axle and to said main frame members for securing said frame in an upwardly inclined position, a hoisting tackle mounted on said frame with the block thereof at the front end of said frame, and means for operating said hoisting tackle.

4. The combination with a tractor including front and rear axles, of a derrick comprising, a boom frame connected to said rear axle, a supporting frame connected to said front axle, and means connecting said latter frame to said boom frame permitting a rocking of said front axle.

5. The combination with a tractor having front and rear axles, of a derrick comprising a boom frame extending longitudinally of the tractor and having the rear end thereof rigidly secured to the rear axle, means secured to the front axle and extending upwardly therefrom for supporting said frame in an upwardly inclined position, a hoisting tackle mounted on said frame with the block thereof at the front end of said frame, and means for operating said hoisting tackle.

6. The combination with a tractor having front and rear axles, of a derrick comprising a boom frame extending longitudinally of the tractor having one end connected to the rear axle, a supporting frame for said boom frame connected to and extending upwardly from said front axle, and a connection between said boom frame and supporting frame permitting a relative transverse movement between said parts upon a rocking of said front axle.

7. The combination with a tractor having a rockable axle, of a derrick comprising a boom frame mounted on said tractor, a supporting frame rigidly connected to said axle providing a vertical support for said boom, and a connection between said boom and supporting frame permitting a relative transverse movement of said last mentioned frame upon a rocking of said axle.

8. The combination with a tractor having a rockable axle, of a derrick comprising a boom rigidly mounted in a forwardly extending position, a supporting frame connected to said axle, and a sliding connection between said frame and boom to permit a rocking of said axle.

9. The combination with a tractor including front and rear axles, of a derrick comprising a boom frame connected to said rear axle, a supporting frame connected to said front axle, and means for connecting said boom frame with the supporting frame including a bracket rigidly secured to the boom frame and slidably engaging said supporting frame.

10. The combination with a tractor including front and rear axles, of a derrick comprising a boom rigidly connected to said rear axle, a substantially U-shaped supporting frame secured to said front axle and extending upwardly therefrom, a connection between said boom and supporting frame permitting a relative transverse movement between said parts including a bracket rigidly secured to the boom and slidably engaging said supporting frame, and means for preventing vertical displacement of said bracket.

In testimony whereof I affix my signature.

THOMAS F. RAINSFORD.